United States Patent
Spaans et al.

(10) Patent No.: US 10,973,177 B2
(45) Date of Patent: Apr. 13, 2021

(54) PROCESS TO REDUCE THE TEMPERATURE OF A FEED OF AIR AND GREENHOUSE

(71) Applicant: Van der Hoeven Horticultural Projects B.V., Den Hoorn (NL)

(72) Inventors: Peter Ruben Spaans, Den Hoorn (NL); Vincent Martijn Kickert, Den Hoorn (NL)

(73) Assignee: Van der Hoeven Horticultural Projects B.V., Den Hoorn (NL)

( * ) Notice: Subject to any disclaimer, the term of this patent is extended or adjusted under 35 U.S.C. 154(b) by 278 days.

(21) Appl. No.: 16/091,665

(22) PCT Filed: Apr. 4, 2017

(86) PCT No.: PCT/NL2017/050210
§ 371 (c)(1),
(2) Date: Oct. 5, 2018

(87) PCT Pub. No.: WO2017/176114
PCT Pub. Date: Oct. 12, 2017

(65) Prior Publication Data
US 2019/0150376 A1 May 23, 2019

(30) Foreign Application Priority Data
Apr. 8, 2016 (NL) .................................... 2016574

(51) Int. Cl.
*A01G 9/24* (2006.01)
*F24F 3/14* (2006.01)
*F24F 5/00* (2006.01)

(52) U.S. Cl.
CPC ............ *A01G 9/246* (2013.01); *F24F 3/1417* (2013.01); *F24F 5/0035* (2013.01); *Y02A 40/25* (2018.01)

(58) Field of Classification Search
CPC ...... A01G 9/246; F24F 3/1417; F24F 5/0035; Y02A 40/25
(Continued)

(56) References Cited

U.S. PATENT DOCUMENTS 2,769,313 A * 11/1956 Goetz .................. F24F 3/1417
62/177
4,171,620 A 10/1979 Turner
(Continued)

FOREIGN PATENT DOCUMENTS

| EP | 1 464 219 A1 | 10/2004 |
|---|---|---|
| WO | 2004/032606 A1 | 4/2004 |
| WO | 2008/002686 A1 | 1/2008 |

OTHER PUBLICATIONS

International Search Report and Written Opinion of International Searching Authority in International Patent Application No. PCT/NL2017/050210.

*Primary Examiner* — Ana M Vazquez
(74) *Attorney, Agent, or Firm* — Venable LLP

(57) ABSTRACT

A process to reduce the temperature of a feed of air by (a) contacting the feed of air with liquid water, wherein part of the water evaporates to obtain air with a higher humidity and a reduced temperature. The air obtained in step (a) is contacted in step (b) with an aqueous hygroscopic solution to obtain air with a reduced humidity. In a step (c) the air obtained in step (b) is contacted with liquid water, wherein part of the water evaporates to obtain air with a reduced temperature as compared to the air obtained in step (a). In a step (d) the water diluted hygroscopic solution obtained in step (b) is concentrated and cooled to obtain a concentrated and cooled hygroscopic solution, with the solution being used as the aqueous hygroscopic solution or as part of the aqueous hygroscopic solution in step (b).

21 Claims, 4 Drawing Sheets

(58) Field of Classification Search
USPC .............................................................. 62/92
See application file for complete search history.

(56) References Cited

U.S. PATENT DOCUMENTS 4,180,126 A * 12/1979 Rush ..................... F24F 3/1423
165/59
2015/0047382 A1 2/2015 Jappen et al.

* cited by examiner

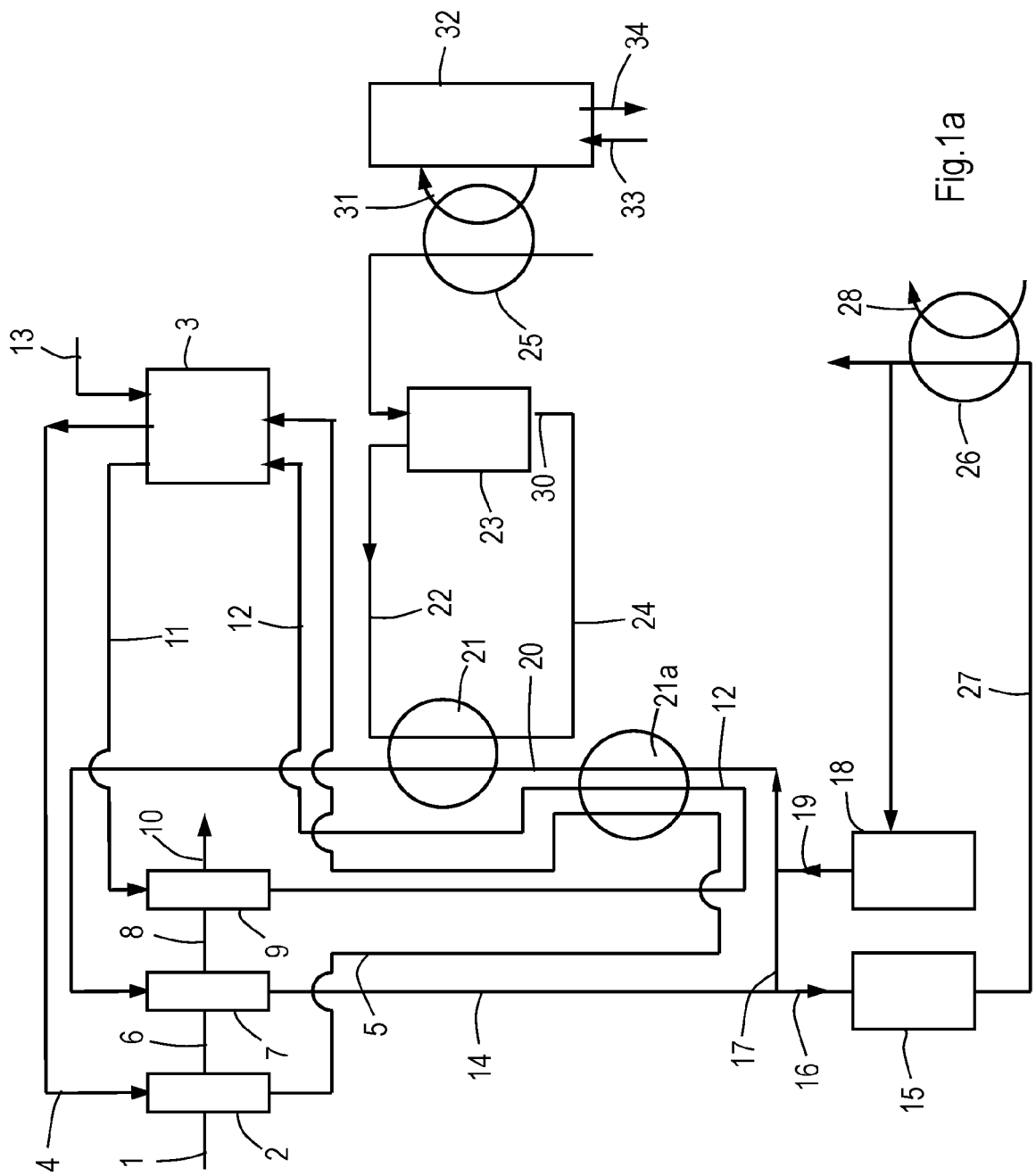

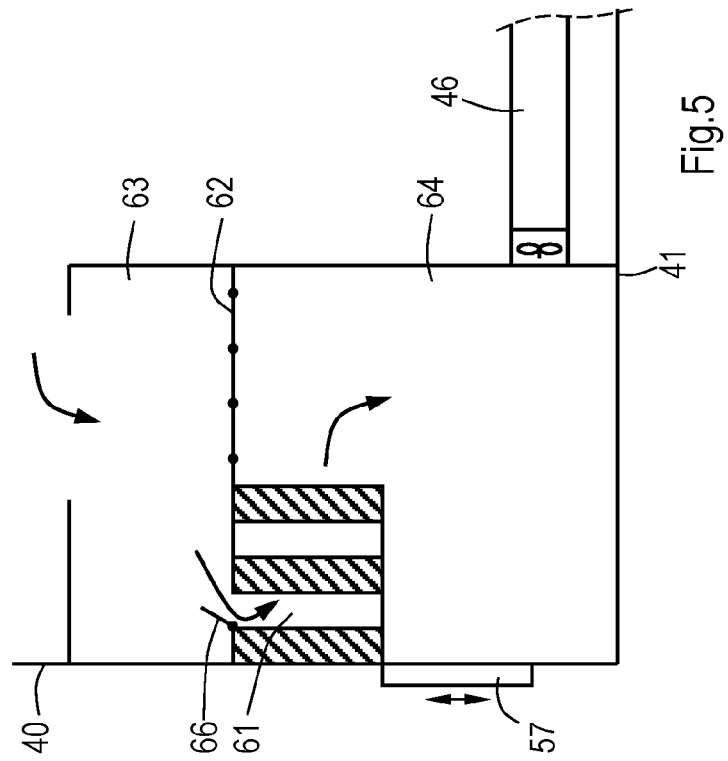
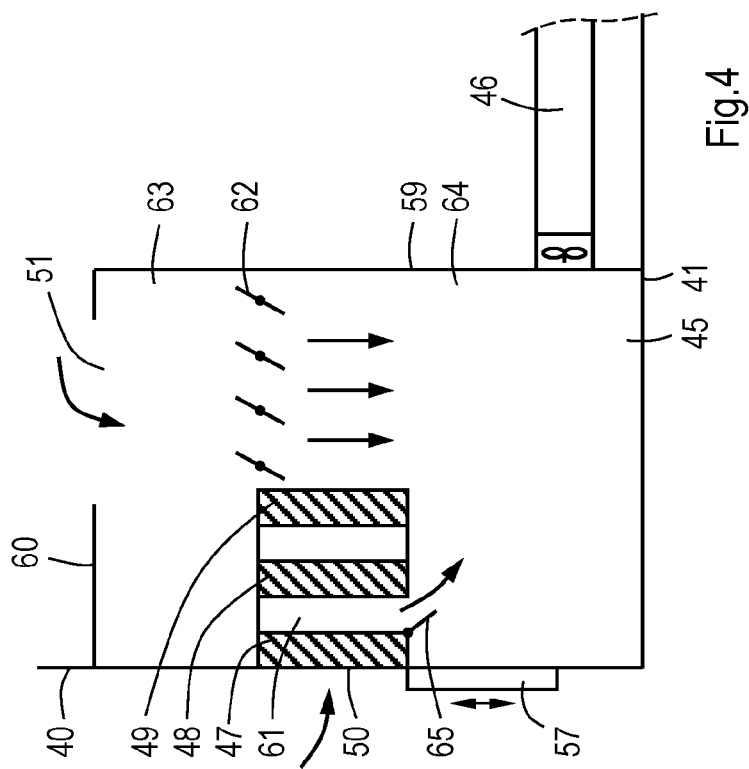

PROCESS TO REDUCE THE TEMPERATURE OF A FEED OF AIR AND GREENHOUSE

This application is a national stage entry of International Patent Application No. PCT/NL2017/050210, filed Apr. 4, 2017, which is incorporated by reference in its entirety.

This application claims priority to Netherlands Patent Application No. 2016574, filed Apr. 8, 2016, which is incorporated by reference in their entirety.

BACKGROUND

The invention is directed to a process to reduce the temperature of a feed of air and directed to a greenhouse comprising numerous parallel and substantially horizontal oriented air distribution tubes and a cooling section.

Semi-closed greenhouses are described in a 1992 article titled "Verdampingskoeling voor tuinbouwkassen" (Evaporative cooling for greenhouses) by Van Paassen, A. H. C. et al, in Klimaatbeheersing 21 pp 165-172 (1992). In such a greenhouse, ambient air, recycle air from within the greenhouse, or their mixtures is distributed via numerous parallel oriented ventilation tubes to the greenhouse. The term "semi-closed" refers to the fact that ambient air may be provided to the greenhouse, and the greenhouse is also equipped to only or partly recycle a large portion of its own air. The ventilation tubes are positioned parallel below the cultivation. The air is cooled by injection of liquid water into the ventilation tubes. Examples of semi-closed greenhouses are described in WO2004/032606, EP1464219, and WO2008/002686. Various semi-closed greenhouses have been build and successfully operated.

A problem of the known semi-closed greenhouse is that when the ambient air has a high dew point it becomes difficult to efficiently cool the ambient air. Traditional evaporative cooling does not suffice and more energy consuming refrigerating cooling is required to achieve a sufficient reduction in temperature of the ambient air. An alternative would be to use a so-called closed greenhouse. However, a closed greenhouse has the disadvantage that no fresh air is provided to the greenhouse. Thus, additional measures to add, for example, carbon dioxide are required to operate such a greenhouse. Furthermore, energy consuming refrigerating cooling is also required for such a closed greenhouse when the ambient temperature is high.

SUMMARY OF THE INVENTION

There is thus a desire to provide a process to reduce the temperature of a feed of air in a more efficient manner, especially a feed of air having a high dew point. The following process achieves this.

A process to reduce the temperature of a feed of air by:

(a) contacting the feed of air with liquid water, wherein part of the water evaporates to obtain air with a higher humidity and a reduced temperature as compared to the feed of air, (b) contacting the air obtained in step (a) with an aqueous hygroscopic solution to obtain air with a reduced humidity as compared to the air obtained in step (a) and a water diluted hygroscopic solution, (c) contacting the air obtained in step (b) with liquid water, wherein part of the water evaporates to obtain air with a reduced temperature as compared to the air obtained in step (a), wherein, in a step (d) the water diluted hygroscopic solution obtained in step (b) is concentrated and cooled to obtained a concentrated and cooled hygroscopic solution, which solution is used as the aqueous hygroscopic solution or as part of the aqueous hygroscopic solution in step (b).

The inventors have found that with the process according to the invention, an efficient process is obtained to reduce the temperature of air, especially air having a high dew point. By performing step (b) on a highly saturated air flow obtained in step (a), water diluted hygroscopic solution having a high energy content is obtained. This energy can be used to further improve the efficiency of the process. Furthermore, it is possible to perform this process without having to add fresh water or large amounts of fresh water.

The dew point of the feed of air is preferably high and more preferably above 30° C. The dew point of the air obtained in step (c) is suitably below 30° C. Because the saturation of the air obtained in step (c) will be high, suitably above 90% relative humidity, the temperature of the air obtained will be below than 30° C., suitably between 25° C. and 29° C. Such a temperature and saturation of air is suitable for use in a greenhouse.

Step (a) may be performed by any process wherein liquid water directly contacts the feed of air. This may be achieved by spraying water into a stream of feed of air, for example in a transport conduit. Preferably so-called evaporating pads are used where water flows along an open surface area in a downward direction and the feed of air passes the open surface area and water in a substantial horizontal direction. Due to evaporation of part of the liquid water a temperature decrease and a water saturation increase of the air passing the evaporating pad will result. The temperature of the water is preferably between the temperature of the feed of air as provided to step (a) and the dew point of the feed of air. It has been found advantageous that the air obtained in step (a) is saturated with water or almost saturated with water. The air obtained in step (a) preferably has a relative humidity of above 85% and more preferably above 90%.

In step (b) the air obtained in step (a) is contacted with an aqueous hygroscopic solution. This aqueous hygroscopic solution may comprise of hygroscopic salts or glycols. Examples of hygroscopic salts are lithium chloride, magnesium chloride, calcium chloride, potassium formate, and sodium chloride. Preferably glycols are used because they are less corrosive. Examples of suitable glycols are ethylene glycol, propylene glycol, and butylene glycol. Propylene glycol, also known as 1,2-propanediol, is preferred when the process is used in a greenhouse because this compound is not poisonous.

In step (b) the air obtained in step (a) directly contacts the aqueous hygroscopic solution in a similar manner as in an evaporative cooling pad of step (a). The liquid aqueous hygroscopic solution may run down along an open surface area and the air flows horizontally through the open surface in a so-called hygroscopic dehumidification pad. Water vapour present in the air is absorbed by the liquid aqueous hygroscopic solution. In this process step water will thus condensate and the resulting latent heat of condensation will result in an increase of temperature of the aqueous hygroscopic solution and an increase in temperature of the air as it contacts the aqueous hygroscopic solution in step (b). In some applications the surface area and liquid water is locally cooled to improve the dehumidification efficiency of the hygroscopic dehumidification pad. The inventors have now found that it is more efficient to obtain a relatively warm water diluted hygroscopic solution in step (b). This is because such a warmer water diluted hygroscopic solution in step (b) may be more efficiently regenerated in step (d).

The concentration of 1,2-propanediol in the aqueous hygroscopic solution as provided to step (b) is preferably above 80 wt %. The temperature of the aqueous hygroscopic solution as provided to step (b) is preferably as low as possible, more preferably above −10° C., and even more preferably above 4° C. The temperature of the aqueous hygroscopic solution as provided to step (b) is preferably below 6° C. above the temperature of the feed of air as provided to step (a), and more preferably below 10° C.

In step (c) the air obtained in step (b) is contacted with liquid water. This may be performed in the same manner as described for step (a). Preferably step (c) is performed in the earlier described evaporative pad. By performing steps (a) and (b) the dew point and enthalpy of the air is reduced such that when this air is subjected to step (c) an efficient temperature reduction is achieved.

Preferably the air obtained in step (c) is fed to the interior of a greenhouse. In such an application, or similar applications where ambient air needs to be supplied to the interior of a building, the need to cool the ambient air will vary. For example, during day time the dew point and/or temperature of the ambient air may be too high for direct admission into the greenhouse or building, while during the night the dew point and/or temperature may be sufficient for admission. The process is especially suited for such situations because an efficient regeneration of the hygroscopic solution and/or cooling fluids will then be possible as will be explained in more detail below. Suitably the concentration of the water diluted hygroscopic solution of step (d) is thus performed continuously, while steps (a), (b), and (c) are performed non-continuously. More preferred is when the concentration of the water diluted hygroscopic solution of step (d) to obtain a concentrated hygroscopic solution is performed at least 23 hours per day, and steps (a), (b), and (c) are performed between 1 and 14 hours per day. It will be understood that when steps (a), (b), and (c) are performed, the ambient air may have a dew point and/or temperature which requires the temperature reduction process according to the invention to be performed.

In the above continuous-non-continuous process it is preferred that part of the water diluted hygroscopic solution as obtained in step (b) is stored in an insulated storage container and part of the water diluted hygroscopic solution as obtained in step (b) is mixed with the concentrated hygroscopic solution. The resulting mixture is used as the aqueous hygroscopic solution in step (b) in the above referred to 1 to 14 hours per day. The concentrated hygroscopic solution is obtained by evaporation of part of the water as present in a stream of water diluted hygroscopic solution as discharged from the insulated container in at least 23 hours per day. The heat source for performing this evaporation may be any hot gaseous or liquid stream. The heat exchange may be by direct heat exchange and preferably by indirect heat exchange. In such a process embodiment the regeneration of the water diluted hygroscopic solution may be performed in at least 23 hours per day, which in normal continuous operation will be 24 hours per day. In this manner an efficient use is made of the regenerating process equipment.

In the above continuous-non-continuous process it is preferred that the mixture of water diluted hygroscopic solution and concentrated hygroscopic solution is cooled before being used in step (b) when steps (a), (b), and (c) are performed. The mixture is preferably cooled by indirect heat exchange against a cooling fluid resulting in the concentrated and cooled hygroscopic solution and used cooling fluid. This manner of operation results in that the cooling fluid is only used when steps (a), (b), and (c) are performed while the used cooling fluid may be reduced in temperature for reuse as the cooling fluid performed at least 23 hours per day. In this manner an efficient use is made of the process equipment involved in cooling the used cooling fluid.

The used cooling fluid may be reduced in temperature for reuse as the cooling fluid by any known cooling process. Applicant found that an efficient process is achievable when the used cooling fluid is reduced in temperature by means of an absorption refrigerator process. An example of a suitable absorption refrigerator process comprises the steps of (i) evaporation of liquid ammonia, (ii) absorption of ammonia vapour by contacting with liquid water resulting in a water phase saturated with ammonia, (iii) heating the ammonia saturated water phase to separate gaseous ammonia from the liquid water, and (iv) cooling the gaseous ammonia such that ammonia condenses for reuse in step (i). In such a process the used cooling fluid is reduced in temperature by the cooling effect of the evaporation of ammonia in step (i). The heat source for performing step (iii) may be any hot liquid or gas stream, for example a waste heat stream. Preferably the heat source is steam. When the steam is also used for the regeneration of the water diluted hygroscopic solution as described above, a process is obtained which can be operated using only steam as the source of power. The cooling of gaseous ammonia in step (iv) may be partly performed by indirect heat exchange with the water diluted hygroscopic solution as it is discharged from its storage and before the concentration step. The thus cooled ammonia may be further cooled by conventional means, such as in a cooling tower.

When the air obtained in step (c) is fed to the interior of a greenhouse, it may be preferred that the air is fed to the interior of a greenhouse via numerous parallel oriented air distribution tubes having multiple openings along their length to distribute the air within the interior of the greenhouse. In such a process it may be preferred that the air with a reduced temperature as obtained in step (c) is first supplied to a common space that is fluidly connected to at least 5 air distribution tubes and to which a recycle flow of air from within the greenhouse is also provided. More preferably, the air with a reduced temperature as obtained in step (c) is first supplied to the common space between the aforementioned 1 and 14 hours per day, and in the remaining time at least a recycle flow of air from within the greenhouse is provided to the common space to be recycled via the tubes back into the greenhouse. In the period that step (a), (b), and (c) are not performed, it may still be advantageous to let in ambient air into the greenhouse. For example, the temperature of the ambient air may be sufficiently low during the night that intake of this air can be performed without performing the cooling steps (a)-(c). In that situation it may be preferred to at least partly by-pass the evaporative cooling pads and hygroscopic dehumidification pad. Although no liquid runs through the pads, a pressure drop still has to be overcome to draw in the ambient air through the pads. By having a valve between, for example, the evaporative cooling pad of step (a) and the hygroscopic dehumidification pad of step (b), a by-pass is created with a significantly lower pressure drop.

The invention is also directed to a greenhouse comprising:
numerous parallel and substantially horizontal oriented air distribution tubes fluidly connected at one side to a common space; and
a cooling section comprising of a first evaporative cooling pad, a hygroscopic dehumidification pad, and a second evaporative cooling pad, wherein the cooling section fluidly connects the exterior of the greenhouse with the common space, wherein the common space further comprises one or more openings fluidly connecting the interior of the greenhouse with the common space and means to transport air from the common space into the numerous air distribution tubes. The means to transport air may be by any known air displacement means, such as, for example, by ventilators positioned at the inlet of each air distribution tube.

The cooling section suitably comprises of an air inlet fluidly connected to the first evaporative cooling pad, an air outlet fluidly connected to the second evaporative cooling pad, and a by-pass valve between first cooling pad and hygroscopic dehumidification pad with the by-pass valve having a closed position to create a flow path for air through air inlet, the first cooling pad, the hygroscopic dehumidification pad, the second evaporative cooling pad, and air outlet to the common space, and with the by-pass valve having one or more open positions to enable an alternative flow path for air through the air inlet, first cooling pad, and by-pass valve to the common space.

The greenhouse is suitably of the semi-closed type referred to above. The greenhouse suitably has a common space defined by a side wall of the greenhouse, a parallel wall spaced from said side wall, and a roof, wherein in the side wall the cooling section is provided, wherein in the parallel wall openings are present for fluidly connecting the common space with the air distribution tubes, and wherein the parallel wall and/or roof is provided with the one or more openings fluidly connecting the interior of the greenhouse with the common space. The side wall may be the so-called end gable wall or the actual side walls positioned perpendicular to such an end gable wall, given the greenhouse has a rectangular floor plan. The one or more openings fluidly connecting the interior of the greenhouse with the common space are provided with means to open or close these openings such to control the flow of air from within the greenhouse to the common space.

BRIEF DESCRIPTION OF THE DRAWINGS

The invention shall be illustrated by the following Figures.

FIG. 1a shows a scheme similar to that of FIG. 1.

FIG. 4 shows another embodiment for a common space and cooling section.

FIG. 5 shows the common space and cooling section of FIG. 4 in another situation.

DETAILED DESCRIPTION OF THE INVENTION

Figure 1:
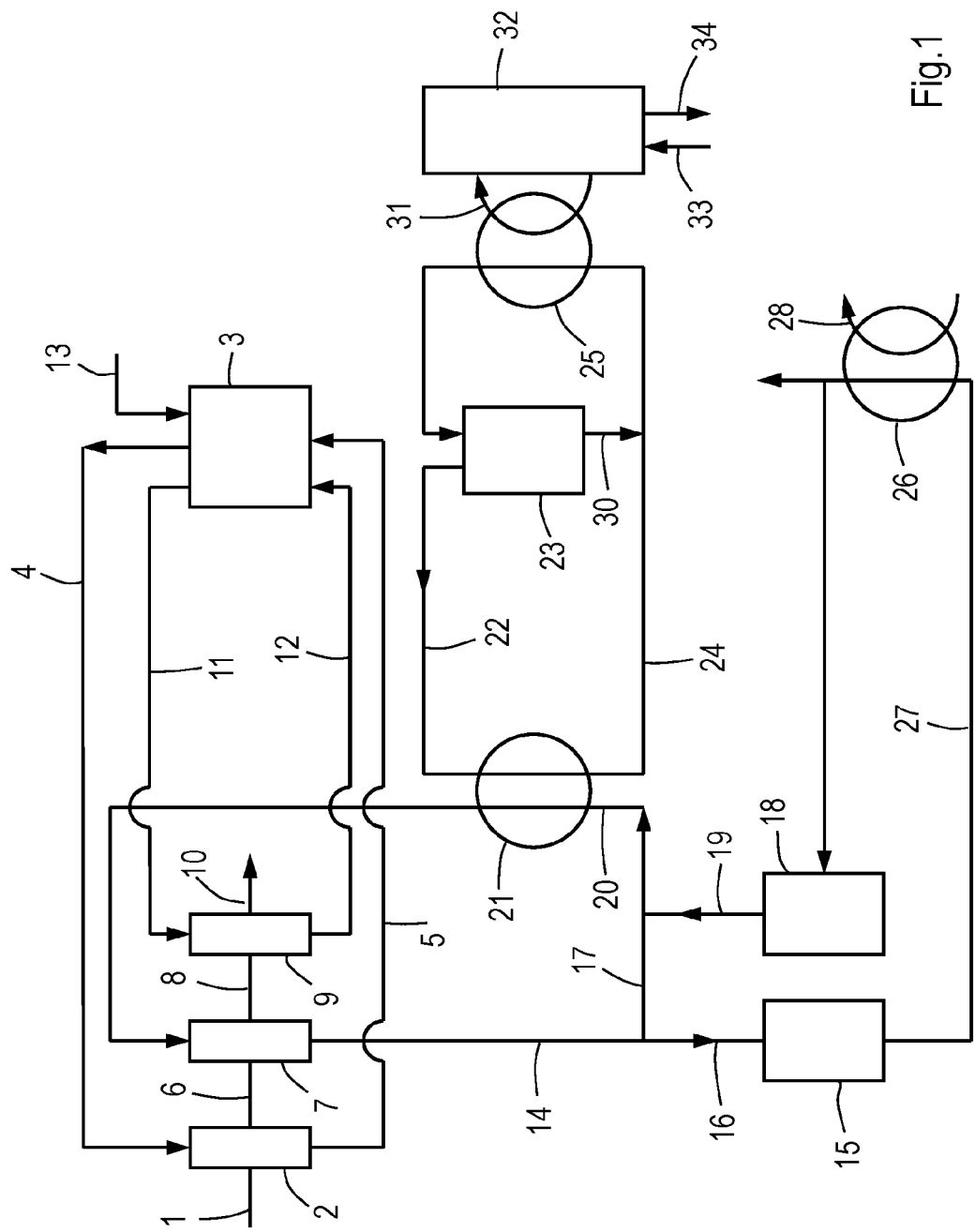
FIG. 1 is a flow diagram of how the process according to the invention may be performed.

FIG. 1 is a flow diagram of how the process according to the invention may be performed. The flow diagram will be used to illustrate a possible operating point of the process. Via stream 1 air with a temperature of 36° C. and a saturation of 70% (having a dew point of 30° C.) is contacted with liquid water in first evaporating pad 2. To first evaporating pad 2 water is supplied from a water tank 3 via stream 4 and returned to tank 3 via stream 5. From evaporating pad 2 air is obtained in stream 6 having a temperature of 31.9° C. and a saturation of 92%. This air is subsequently contacted with a aqueous hygroscopic solution containing 90 wt % 1,2-propanediol in hygroscopic dehumidification pad 7. The air in stream 8 as discharged from the hygroscopic dehumidification pad 7 has a temperature of 33.9° C. and a saturation of 67%. This air is contacted with liquid water in second evaporating pad 9. The air as obtained in stream 10 has a temperature of 29.5° C. and a saturation of 91% and with a dew point of 27.9° C. To second evaporating pad 9 water is supplied from the water tank 3 via stream 11 and returned to tank 3 via stream 12. To tank 3 fresh water or water obtained elsewhere in the process is added via stream 13.

From the hygroscopic dehumidification pad 7 a stream 14 of water diluted hygroscopic solution having a temperature of 39° C. is partly send to an insulated storage tank 15 via stream 16 and partly recycled to the hygroscopic dehumidification pad 7 via stream 17. This part of the water diluted hygroscopic solution as obtained in step (b) is mixed with the concentrated hygroscopic solution as supplied from a storage tank 18 via stream 19. The mixture is sent to the hygroscopic dehumidification pad 7 via stream 20. Stream 20 is cooled to 6° C. in heat exchanger 21 against a cooling fluid. Cooling fluid is provided to heat exchanger 21 via stream 22 from a cooling fluid storage tank 23. The used cooling fluid is returned to tank 23 via steam 24. Stream 24 is reduced in temperature in heat exchanger 25.

The above described process may be performed discontinuous, or in other words, only during a certain period per day when the conditions of the air in stream 1 require cooling by this process. The concentration of the water diluted hygroscopic solution obtained in step (b) and stored in tank 15 and the cooling of the cooling fluid as present in tank 23 is preferably performed continuously, in other words, during the entire 24 hours per day to take full advantage of the process equipment involved.

Concentration of the water diluted hygroscopic solution is performed by evaporating part of the water making use of a heat exchanger 26 to which water diluted hygroscopic solution is provided via stream 27. Because the temperature of the water diluted hygroscopic solution is relatively high because it is stored in an insulated tank, less energy is required to evaporate the required amount of water. The heat source used in heat exchanger 26 may be steam as schematically shown as stream 28. The evaporated water is discharged via stream 29 and may be sent to tank 3.

The cooling fluid as present in tank 23 is continuously reduced in temperature by recirculating the cooling fluid via stream 30 and heat exchanger 25 back to tank 23. The cooling medium used to cool the cooling fluid in stream 31 is by evaporation of liquid ammonia as part of an absorption refrigerator process 32. The required heat source of the absorption refrigerator process 32 is steam as provided via stream 33 and discharged via stream 34.

FIG. 1a shows a scheme like in FIG. 1 except that stream 20 is first cooled in heat exchanger 21a against colder streams 5 and 12.

Figure 3:
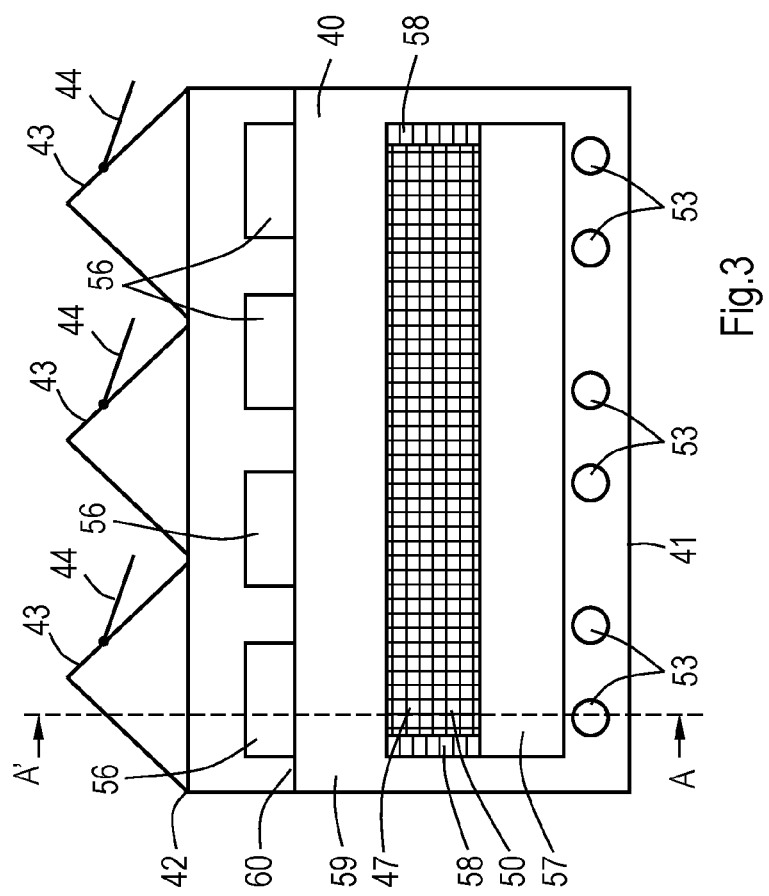
FIG. 3 is a schematically represented greenhouse.
Figure 2:
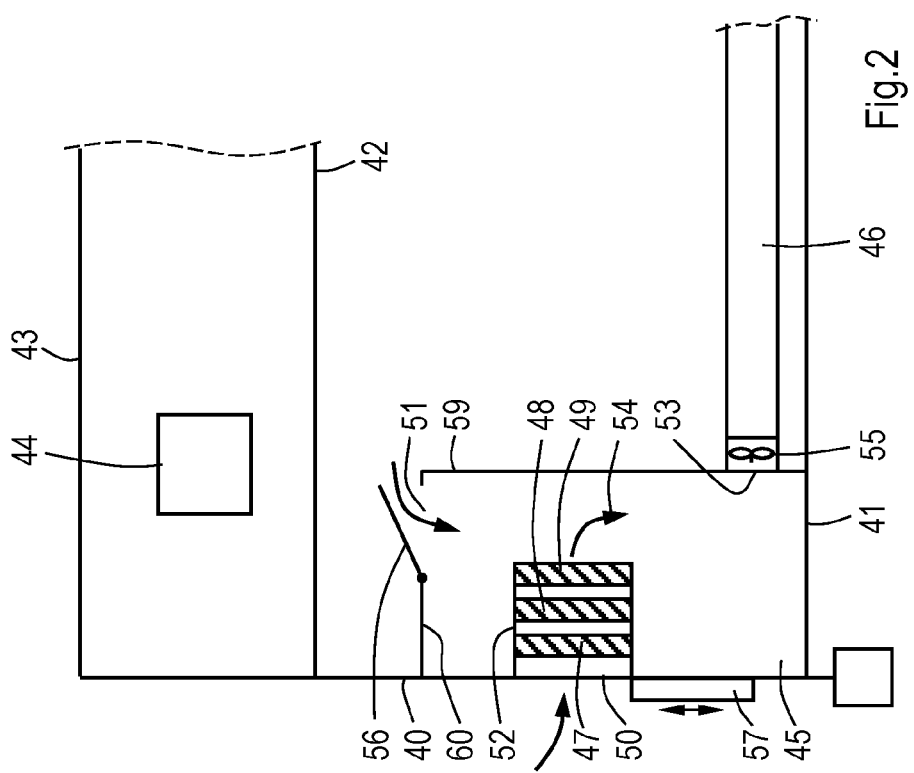
FIG. 2 shows a cross-sectional view AA' of a schematically represented greenhouse.

FIG. 2 shows a cross-sectional view AA' of the schematically represented greenhouse of FIG. 3. The relative dimensions of the various elements are not scaled and sometimes enlarged or limited in order to improve the clarity of the figures. The greenhouse is provided with an end-wall 40, also referred to as end gable, a floor 41, and a saddle roof 43 with gutters 42. Saddle roof 43 is provided with vent openings 44 which can be opened to avoid an over-pressure within the greenhouse. In practice only air flowing to the exterior of the greenhouse will flow through vents 44. Also a common space 45 is shown which can receive ambient air via cooling section 52 and air from within the greenhouse via opening 51. Common space 45 is defined by a partition wall 59, which runs parallel with and spaced away from end wall 40. Partition wall 59 extends to a position below the gutter 42. The upper end of the common space is enclosed by a roof 60. In common space 45 these air streams may be mixed and supplied to the inlet 53 of numerous parallel and substantially horizontal oriented air distribution tubes 46. The inlet 53 of tubes 46 are provided with a ventilator 55. Above such tubes 46 the cultivation as grown in the greenhouse may be positioned. The cooling section 52 is provided with an air inlet 50 for entry of ambient air, a first evaporative cooling pad 47, a hygroscopic dehumidification pad 48, and a second evaporative cooling pad 49. The supply and discharge conduits for the evaporative fluids and hygroscopic fluids to pads 47, 48, and 49 as described in FIG. 1 are not shown in this Figure for clarity reasons. The ambient air flows by means of a substantially horizontal flow path through the pads. The treated air will be discharged from the cooling section 52 as indicated by arrow 54.

Opening 51 can be closed and opened by valve 56 to regulate the amount of air from within the greenhouse. When closed, only ambient air will be provided to the greenhouse via tubes 46. It has been found that some recirculation of greenhouse air is preferred. Thus it may be preferred to design valve 56 such that it cannot fully close opening 51. Air inlet 50 for ambient air can be closed by vertical door 57, which can move upwardly along rails 58. In practice door 57 will not fully enclose air inlet 50 resulting in that some ambient air will always flow to common space 45.

In FIG. 3 the greenhouse according the invention is shown when viewed towards the end wall 40 from the exterior of the greenhouse. The numerals have the same meaning as in FIG. 3. Some details, like valves 56, partition wall 59, and the inlet 53 of tubes 46 are visible because end wall 40 is made of a transparent material. A greenhouse may have a much larger end wall 40 provided with a large air inlet 50 or multiple air inlets 50.

FIG. 4 shows another embodiment for the common space and cooling section. A cooling section 61 is shown provided with the first evaporative cooling pad 47, the hygroscopic dehumidification pad 48, and the second evaporative cooling pad 49. Further, a louvre 62 is shown which can close the upper part 63 of common space 45 from the lower part 64 of common space 45, as shown in FIG. 5. When louvre 62 is open and air inlet 50 is open, air from within the greenhouse and ambient air will be drawn into the lower part 64 of common space 45. In a situation wherein the hygroscopic dehumidification and second evaporative cooling is not required, it may be advantageous in such a modus to by-pass these pads by opening a by-pass valve 65 between first cooling pad 47 and hygroscopic dehumidification pad 48.

FIG. 5 shows the common space and cooling section of FIG. 4 in a situation wherein louvre 62 are closed and door 57 encloses air inlet 50. It may be advantageous to cool the greenhouse by passing the relatively humid air from within the greenhouse over the hygroscopic dehumidification pad 48 and second evaporative cooling pad 49. By opening a second by-pass valve 66 and thereby fluidly connecting the upper space 63 with the inlet of the hygroscopic dehumidification pad 48 such a flow path will result.

The invention claimed is:
1. A process to reduce the temperature of a feed of air, the process comprising:

(a) contacting the feed of air with liquid water wherein part of the water evaporates to obtain air with a higher humidity and a reduced temperature as compared to the feed of air;
(b) contacting the air obtained in step (a) with an aqueous hygroscopic solution to obtain air with a reduced humidity as compared to the air obtained in step (a) and a water diluted hygroscopic solution;
(c) contacting the air obtained in step (b) with liquid water wherein part of the water evaporates to obtain air with a reduced temperature as compared to the air obtained in step (a), and
(d) concentrating and cooling the water diluted hygroscopic solution obtained in step (b) to obtain a concentrated and cooled hygroscopic solution that is used as at least a part of the aqueous hygroscopic solution in step (b).

2. A process according to claim 1, wherein the dew point of the feed of air is above 30° C.

3. A process according to claim 1, wherein the aqueous hygroscopic solution comprises 1,2-propanediol.

4. A process according to claim 1, wherein the dew point of the air obtained in step (c) is below 30° C.

5. A process according to claim 1, wherein the concentration of the water diluted hygroscopic solution of step (d) is performed continuously, and wherein steps (a), (b) and (c) are performed non-continuously.

6. A process according to claim 5, wherein the concentration of the water diluted hygroscopic solution of step (d) to obtain a concentrated hygroscopic solution is performed at least 23 hours per day and steps (a), (b) and (c) are performed between 1 and 14 hours per day.

7. A process according to claim 6, wherein part of the water diluted hygroscopic solution as obtained in step (b) is stored in an insulated storage container and part of the water diluted hygroscopic solution as obtained in step (b) is mixed with the concentrated hygroscopic solution, and the resulting mixture is used as the aqueous hygroscopic solution in step (b) in the 1 to 14 hours per day, and wherein the concentrated hygroscopic solution is obtained by evaporation of part of water present in a stream of water diluted hygroscopic solution as discharged from the insulated container in the at least 23 hours per day.

8. A process according to claim 7, wherein the mixture is cooled before being used in step (b) when steps (a), (b), and (c) are performed.

9. A process according to claim 8, wherein the concentrated hygroscopic solution is cooled by indirect heat exchange against a cooling fluid resulting in the concentrated and cooled hygroscopic solution and used cooling fluid.

10. A process according to claim 9, wherein the used cooling fluid is reduced in temperature for reuse as the cooling fluid in a cooling step performed at least 23 hours per day.

11. A process according to claim 10, wherein the used cooling fluid is reduced in temperature by means of an absorption refrigerator process.

12. A process according to claim 11, wherein the absorption refrigerator process comprises the steps of (i) evaporation of liquid ammonia, (ii) absorption of ammonia vapour by contacting with liquid water resulting in a water phase saturated with ammonia, (iii) heating the ammonia saturated water phase to separate gaseous ammonia from the liquid water and (iv) cooling the gaseous ammonia such that ammonia condenses for reuse in step (i).

13. A process according to claim 12, wherein the used cooling fluid is reduced in temperature by the cooling effect of the evaporation of ammonia in step (i).

14. A process according to claim 1, wherein the air with the reduced temperature obtained in step (c) is fed to an interior of a greenhouse.

15. A process according to claim 14, wherein the air with a reduced temperature is fed to the interior of the greenhouse via parallel oriented air distribution tubes having multiple openings along their length such to distribute the air within the interior of the greenhouse.

16. A process according to claim 14, wherein the air with a reduced temperature as obtained in step (c) is first supplied to a common space that (i) is fluidly connected to at least five air distribution tubes and (ii) to which a recycle flow of air from within the greenhouse is also provided.

17. A process according to claim 16, wherein the air with a reduced temperature obtained in step (c) is first supplied to the common space between 1 and 14 hours per day, and in the remaining time at least the recycle flow of air from within the greenhouse is provided to the common space to be recycled via the tubes back into the greenhouse.

18. A greenhouse comprising:
parallel and substantially horizontal oriented air distribution tubes fluidly connected at one side to a common space; and
a cooling section comprising of a first evaporative cooling pad, a hygroscopic dehumidification pad, and a second evaporative cooling pad, wherein the cooling section fluidly connects an exterior of the greenhouse with the common space,
wherein the common space further comprises one or more openings fluidly connecting an interior of the greenhouse with the common space and means to transport air from the common space into the air distribution tubes.

19. A greenhouse according to claim 18, wherein the cooling section includes an air inlet fluidly connected to the first evaporative cooling pad, an air outlet fluidly connected to the second evaporative cooling pad and a by-pass valve between first evaporative cooling pad and the hygroscopic dehumidification pad, the by-pass valve having (i) a closed position to create a flow path for air through the air inlet, the first evaporative cooling pad, the hygroscopic dehumidification pad, the second evaporative cooling pad, and the air outlet to the common space, and (ii) one or more open positions to enable an alternative flow path for air through the air inlet, first cooling pad, and by-pass valve to the common space.

20. A greenhouse according to claim 18, wherein the common space is defined by a side wall of the greenhouse, a parallel wall spaced from the side wall, and a roof,
wherein the cooling section is provided in the side wall,
wherein openings are present in the parallel wall for fluidly connecting the common space with the air distribution tubes, and
wherein the parallel wall and/or roof is provided with the one or more openings fluidly connecting the interior of the greenhouse with the common space.

21. A greenhouse according to claim 20, wherein the one or more openings fluidly connecting the interior of the greenhouse with the common space are provided with means to open or close the one or more openings such to control the flow of air from within the greenhouse to the common space.

* * * * *